(12) United States Patent
Kawasaki

(10) Patent No.: US 10,721,369 B2
(45) Date of Patent: Jul. 21, 2020

(54) IMAGE FORMING APPARATUS PERFORMING IMAGE QUALITY ADJUSTMENT FOR FOIL STAMPING

(71) Applicant: Konica Minolta, Inc., Chiyoda-ku, Tokyo (JP)

(72) Inventor: Tetsu Kawasaki, Tokyo (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/445,026

(22) Filed: Feb. 28, 2017

(65) Prior Publication Data

US 2017/0257508 A1 Sep. 7, 2017

(30) Foreign Application Priority Data

Mar. 1, 2016 (JP) ................. 2016-039359

(51) Int. Cl.
| | | |
|---|---|---|
| H04N 1/00 | (2006.01) | |
| G03G 15/00 | (2006.01) | |
| H04N 1/04 | (2006.01) | |
| H04N 1/23 | (2006.01) | |
| H04N 1/29 | (2006.01) | |

(52) U.S. Cl.
CPC ......... *H04N 1/00925* (2013.01); *G03G 15/50* (2013.01); *G03G 15/5016* (2013.01); *G03G 15/6582* (2013.01); *H04N 1/04* (2013.01); *H04N 1/2338* (2013.01); *H04N 1/29* (2013.01); *H04N 2201/0082* (2013.01); *H04N 2201/3271* (2013.01)

(58) Field of Classification Search
None
See application file for complete search history.

(56) References Cited

U.S. PATENT DOCUMENTS 8,081,891 B2 * 12/2011 Otsuka ............... G03G 15/0194
399/49
9,037,065 B2    5/2015 Suzuki
(Continued)

FOREIGN PATENT DOCUMENTS

JP    62-255184 A    11/1987
JP    2009122201 A    6/2009
(Continued)

OTHER PUBLICATIONS

Chinese Office Action dated Oct. 8, 2018 in Chinese Application No. 201710102547.6 by the State Intellectual Property Office and English translation (17 pgs.).
(Continued)

*Primary Examiner* — Mohammad H Ghayour
*Assistant Examiner* — Pawan Dhingra
(74) *Attorney, Agent, or Firm* — Buchanan Ingersoll & Rooney PC

(57) ABSTRACT

An image forming apparatus includes an image forming unit that forms an image based on image data; and a control unit that controls the image forming unit, the control unit is capable of controlling an image quality adjustment operation in the image forming unit, and in formation of an image on which foil stamping is performed, selection of no performance of an image quality adjustment or/and selection of performance of an image quality adjustment for foil stamping is enabled.

20 Claims, 4 Drawing Sheets

(56) References Cited

U.S. PATENT DOCUMENTS

| | | | | |
|---|---|---|---|---|
| 2002/0124942 | A1* | 9/2002 | Yokozawa | B41F 16/00 156/233 |
| 2004/0183880 | A1* | 9/2004 | Kito | B41J 11/009 347/101 |
| 2010/0051165 | A1* | 3/2010 | Tombs | H05K 3/1266 156/60 |
| 2010/0104336 | A1* | 4/2010 | Christopher | G03G 15/6585 399/341 |
| 2011/0122461 | A1* | 5/2011 | Tanaka | H04N 1/00002 358/474 |
| 2011/0150520 | A1* | 6/2011 | Kasahara | G03G 15/238 399/76 |
| 2011/0182598 | A1* | 7/2011 | Watanabe | G03G 15/0131 399/39 |
| 2011/0216341 | A1* | 9/2011 | Moro | G06F 3/12 358/1.13 |
| 2011/0229819 | A1* | 9/2011 | Hiramoto | G03G 15/6582 430/124.13 |
| 2013/0287455 | A1* | 10/2013 | Suzuki | G03G 15/16 399/297 |
| 2017/0305062 | A1* | 10/2017 | Xia | B05B 9/0413 |
| 2018/0117660 | A1* | 5/2018 | Shin | C09D 183/04 |

FOREIGN PATENT DOCUMENTS

| | | |
|---|---|---|
| JP | 2009-226863 | 10/2009 |
| JP | 2010014898 A | 1/2010 |
| JP | 2010186016 A | 8/2010 |
| JP | 2011-154218 A | 8/2011 |
| JP | 2011-161813 A | 8/2011 |
| JP | 2012501468 A | 1/2012 |
| JP | 2013195909 A | 9/2013 |
| JP | 2013242533 A | 12/2013 |
| JP | 2015028592 A | 2/2015 |
| JP | 2015200813 A | 11/2015 |

OTHER PUBLICATIONS

Office Action (Notification of Reasons for Refusal) dated Aug. 13, 2019, by the Japanese Patent Office in corresponding Japanese Patent Application No. 2016-039359, and an English Translation of the Office Action. (12 pages).

Notification of Reasons for Refusal issued in corresponding Japanese Patent Application No. 2016-039359, dated Oct. 15, 2019, with English Translation (6 pages).

* cited by examiner

IMAGE FORMING APPARATUS PERFORMING IMAGE QUALITY ADJUSTMENT FOR FOIL STAMPING

The present U.S. patent application claims a priority under the Paris Convention of Japanese patent application No. 2016-039359 filed on Mar. 1, 2016, the entire content of which is hereby incorporated by reference.

BACKGROUND OF THE INVENTION

Field of the Invention

The present invention relates to an image forming apparatus which forms an image for foil transfer to enable foil stamping, an image formation managing apparatus, and a computer-readable recording medium storing a control program.

Description of the Related Art

Among image forming apparatuses which print an image on a transfer medium based on image data, there is known an apparatus which forms an image for foil transfer on a transfer medium, performs foil stamping on the transfer medium, and thereby, transfers a foil film on the transfer medium (for example, see Japanese Patent Laid-Open No. 62-255184). With this apparatus, a developing agent whose image has been formed is overlapped with a foil film sheet to be heated, and thereby, a foil film is fixed using the developing agent as an adhesive agent.

Now, for an image forming apparatus, processing of periodically performing an image quality correction for each output of a periodical number of pages or the similar processing is performed since image quality changes as a change with the elapse of time. In such an image quality correction, an image quality correction is performed, for example, by forming image patches on a plurality of sheets, reading the image patches by a reading unit such as a scanner, and deciding the state of image formation in accordance with the results of reading. In performing normal image formation, gradation, density unevenness, the maximum density, and positions and density displacements for each color are needed to be corrected.

The aforementioned image quality correction consumes the developing agent and it is desirable to reduce the consumption as much as possible. From such a point of view, Japanese Patent Laid-Open No. 2011-161813 (hereinafter referred to as Patent Literature 1) discloses that it can be determined whether the correction is performed or not based on the rate of color pages or the resolution, or a user can be confirmed in whether the correction is skipped or not. Moreover, Japanese Patent Laid-Open No. 2011-154218 (hereinafter referred to as Patent Literature 2) discloses that a monochrome correction is suppressed by including, separately for monochrome/color printing, thresholds of timing (printing time intervals) at which maximum density corrections for each color are performed.

When the image for foil stamping is formed for fixing the foil film at a foil stamping machine in a post-stage, image quality of the formed image does not affect quality of a final output article, and hence, necessity of the aforementioned corrections can be said to be low. Patent Literature 1 and Patent Literature 2 merely give disclosures regarding performance of an adjustment that is not needed (or not frequently needed) in printing monochrome images, and according to these, switching between adjustments in outputting a normal image and in outputting an image for foil stamping cannot be performed.

SUMMARY OF THE INVENTION

Hence, useless adjustments such as gradation correction and density unevenness correction that are not needed in image formation for foil stamping are performed, which causes problems of a long output time and early deterioration of consumable supplies. Moreover, there can be considered a configuration in which in a foil stamping machine, toners for plural colors are used to increase the amount of toner for adhesion, and to such a configuration, the preconditions of the aforementioned inventions of prior arts do not apply.

The present invention is devised in view of the aforementioned circumstances, and an object thereof is to provide an image forming apparatus capable of performing efficient printing while saving toner consumption by not performing or suppressing image quality adjustments in forming an image for foil stamping, an image formation managing apparatus, and a computer-readable recording medium storing a controlling program.

To achieve at least one of the above-mentioned objects, according to an aspect, an image forming apparatus reflecting one aspect of the present invention including:

an image forming unit that forms an image based on image data; and a control unit that controls the image forming unit, wherein the control unit is capable of controlling an image quality adjustment operation in the image forming unit, and in formation of an image on which foil stamping is performed, selection of no performance of an image quality adjustment or selection of performance of an image quality adjustment for foil stamping is enabled.

In the above-mentioned image forming apparatus, it is preferred that the control unit reduces a frequency of the image quality adjustment operation and/or limits types of image quality adjustments to specific one for the foil stamping.

In the above-mentioned image forming apparatus, it is preferred that in formation of the image on which foil stamping is performed, the control unit does not perform the image quality adjustment or employs, as an image quality adjustment operation in which the image quality adjustment for foil stamping is performed, one or more of a gradation correction, a density unevenness correction, positional displacement corrections for each color, density displacement correction for the each color, and a maximum density correction.

In the above-mentioned image forming apparatus, it is preferred that the control unit performs an adjustment in formation of an image on which foil stamping is performed as to a maximum density adjustment out of image quality adjustments.

In the above-mentioned image forming apparatus, it is preferred that, when the image quality adjustment is performed in image formation for foil stamping, the control unit has, as a threshold for performance of the image quality adjustment, a threshold different from that in printing a normal image.

In the above-mentioned image forming apparatus, it is preferred that the control unit has an independent threshold for each image quality adjustment.

In the above-mentioned image forming apparatus, it is preferred that the threshold is an adjustment interval.

In the above-mentioned image forming apparatus, it is preferred that the control unit performs a specific image quality adjustment even in setting of no performance of image quality adjustments in image formation for foil stamping.

In the above-mentioned image forming apparatus, it is preferred that the image forming apparatus further comprises a operation unit that accepts operation input, wherein in the control unit, designation of image formation of a normal image or image formation for foil stamping is enabled, and a content of the designation enables selection of setting of a mode in which the image quality adjustment for the normal image is performed or setting of a mode in which the image quality adjustment for foil stamping is performed.

To achieve at least one of the above-mentioned objects, according to an aspect, an image formation managing apparatus reflecting one aspect of the present invention comprises:

a management control unit that controls an image forming unit that forms an image based on image data, wherein the management control unit is capable of controlling an image quality adjustment operation in the image forming unit, and in formation of an image on which foil stamping is performed, selection of no performance of an image quality adjustment or selection of performance of an image quality adjustment for foil stamping is enabled.

To achieve at least one of the above-mentioned objects, according to an aspect, a non-transitory computer-readable recording medium storing a controlling program executed in a control unit that controls an image forming unit that forms an image based on image data, reflecting one aspect of the present invention comprises:

a step of performing an image quality adjustment operation in the image forming unit; and a step of performing, in formation of an image on which foil stamping is performed, selection of no performance of an image quality adjustment or selection of performance of an image quality adjustment for foil stamping.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENTS

Hereafter, an embodiment of the present invention is described based on the appended drawings. However, the scope of the invention is not limited to the illustrated examples.

Figure 1:
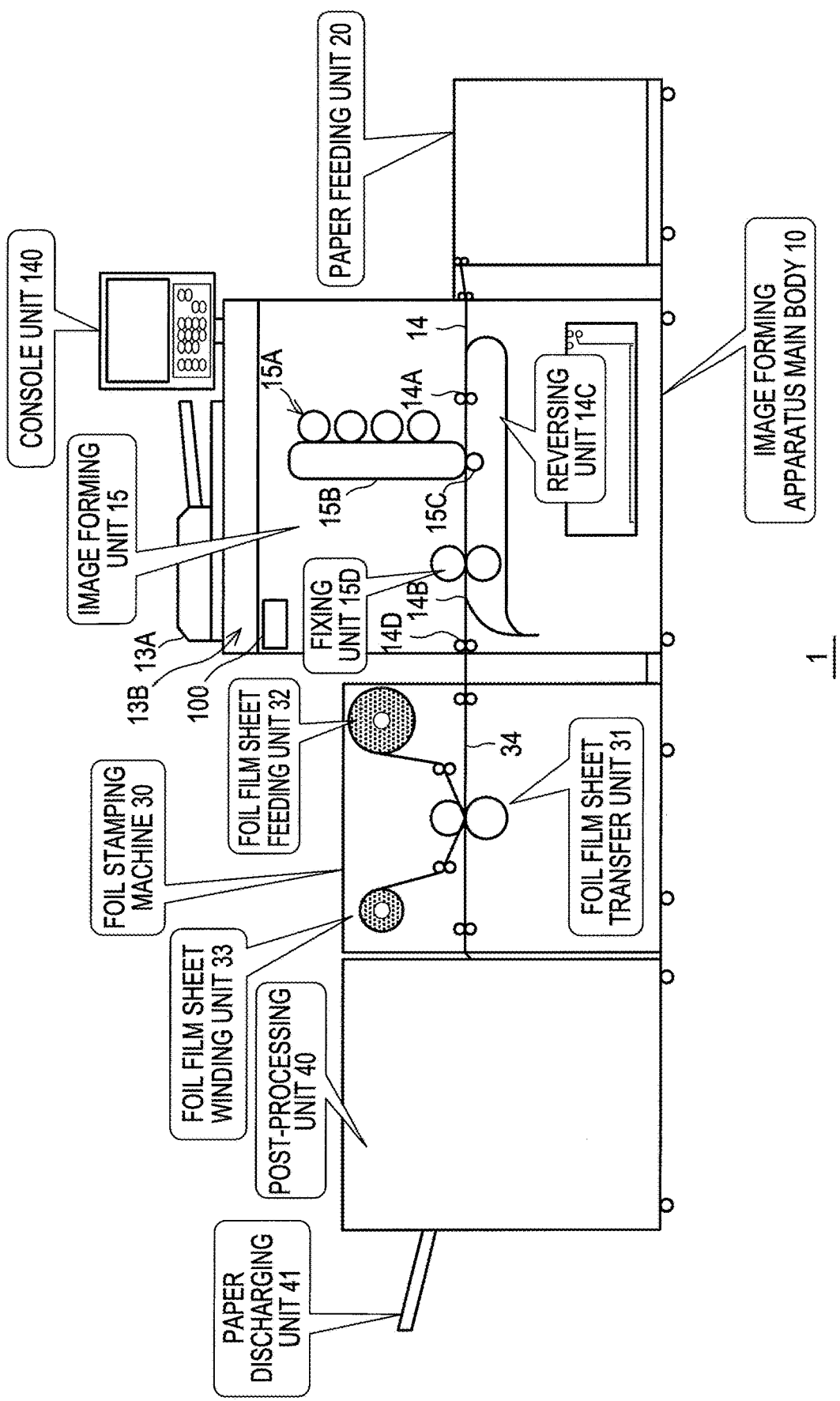
FIG. 1 is a diagram schematically showing an image forming apparatus and an image forming system according to an embodiment of the present invention.

FIG. 1 is a diagram showing a mechanical overview of an image forming system 1 including an image forming apparatus.

The image forming system 1 includes a paper feeding unit 20, an image forming apparatus main body 10, a foil stamping machine 30 and a post-processing unit 40. The post-processing unit 40 corresponds to a post-processing apparatus of the present invention. Notably, in this embodiment, the image forming apparatus main body 10 corresponds to the image forming apparatus. In the present invention, the image forming apparatus can correspond to the image forming apparatus main body 10 that includes the paper feeding unit 20, the foil stamping machine 30, the post-processing unit 40 and the like, its configuration not specially limited.

The paper feeding unit 20 has a mechanism for retaining transfer paper, is joined to the upstream side of the image forming apparatus main body 10 in the sheet conveying direction, and has a plurality of stages of paper feeding trays (not shown) containing sheets. Each paper feeding tray is a universal tray configured such that sheets in any size can be put therein. The paper feeding unit 20 feeds sheets one by one from a paper feeding tray containing the sheets designated by a user, and sequentially feeds them to the downstream image forming apparatus main body 10 via conveying rollers and the like. Notably, while in the present embodiment, the example in which one paper feeding unit 20 is used is described, not limited to this, two or more of paper feeding units 20 can be joined. The sheet corresponds to a transfer medium of the present invention. Notably, the transfer medium is not limited to paper but can be cloth or plastics, etc. In the present invention, an image only has to be transferred on the transfer medium, whose material is not limited.

In foil transfer processing, the image forming apparatus main body 10 transfers a predetermined image for foil transfer on a sheet fed from the paper feeding unit 20 or a paper feeding unit in the image forming apparatus main body 10, and conveys the sheet to the post-stage foil stamping machine 30.

Moreover, the image forming apparatus main body 10 includes a operation unit 140 for accepting settings of various conditions regarding foil transfer processing and the similar settings through user operation. The operation unit 140 is attached to the upper face part of the cabinet of the image forming apparatus main body 10, and has a touch panel constituted, for example, of an LCD (Liquid Crystal Display) and the like and hard keys which are provided in the peripheral part of this touch panel and include numerical buttons, a printing start button and the like. The operation unit 140 can perform setting of image quality adjustment, and furthermore, in image formation for foil stamping, setting of not performing the image quality adjustment, setting of limiting types of the image quality adjustment, setting of changing a threshold for the image quality adjustment, and the like can be performed. These can be configured by initial setting, and in that case, change of the setting can also be performed on the operation unit 140.

Acceptance of these can be performed on a not-shown computer or the like connected to the image forming apparatus main body 10 via a network or the like, or in various manners.

The foil stamping machine 30 has a mechanism that transfers a foil image onto an image for foil transfer which has been transferred at an image forming unit, and is joined to the downstream side of the image forming apparatus main body 10 in the sheet conveying direction. A foil sheet is heated and pressed onto a sheet that is conveyed from the image forming apparatus main body 10 and on which a predetermined image for foil transfer is transferred, and thereby, a predetermined foil image is transferred thereon. The sheet on which the predetermined foil image has been transferred is conveyed to the post-stage post-processing unit 40.

The post-processing unit 40 is joined to the downstream side of the foil stamping machine 30 in the sheet conveying direction. The post-processing unit 40 performs finisher processing such, for example, as staple processing, center folding processing, three folding processing and saddle stitching staple processing, on the sheet on which the image formation has been completed and which is conveyed from the foil stamping machine 30. Moreover, the post-processing unit 40 discharges the sheet on which the foil transfer processing has been performed by the foil stamping machine 30 to a paper discharging tray.

[Exemplary Configuration of Image Forming Apparatus]

Next, an exemplary configuration of the image forming apparatus main body 10 is described based on FIG. 1. The image forming apparatus main body 10 is called a tandem image forming apparatus, and includes a control unit 100, the operation unit 140, an automatic document feeding unit 13A, an image reading unit 13B, an image forming unit 15, a fixing unit 15D, the paper feeding unit 20 and the like.

The image reading unit 13B irradiates documents or the like conveyed one by one from the automatic document feeding unit 13A with light from a light source, receives reflected light therefrom with a CCD (Charge Coupled Device) 131 (shown in FIG. 2), and thereby, acquires image data of the documents. On the image data acquired by the image reading unit 13B, analog processing, analog/digital (hereinafter referred to as A/D) conversion processing, image compression processing and the like are performed by a reading processing unit 116 (shown in FIG. 2).

The operation unit 140 displays a selection screen on which setting of a type of sheets as transfer mediums to be used, setting of selecting a foil processing region in which a foil is transferred out of the entirety of the image data, setting of an outline region in which each image of predetermined toner images is thickened and enlarged for foil processing, and the similar setting are performed, and accepts settings and the like including the presence or absence of foil image printing of sheets from the user. Notably, the operation unit 140 can be provided in the foil stamping machine 30. A method of setting the foil processing region out of the entirety of the image data is performed, for example, by setting of selecting the attributes of characters, line images, graphics and the like, by setting of selecting the foil processing region by means of inputting its coordinates, or by the similar setting.

The image processing unit 160 generates image data corresponding to the foil processing region selected from the image data.

The image forming unit 15 forms an image in an electrophotographic system, which includes the image forming unit 15 that forms images of yellow (Y), magenta (M) and cyan (C) colors, and an image of black (K) color. The image forming unit 15 includes an intermediate transfer belt 15B which retains an image which is formed by photoreceptors 15A for the colors and developed, and a secondary transfer roller 15C for transferring the image on the intermediate transfer belt 15B onto a sheet.

In the image forming unit 15, the aforementioned photoreceptors 15A for the colors, and a charging unit, an exposing unit, a developing unit and a cleaning unit which are disposed therearound are included. In the figure, the charging unit, the exposing unit, the developing unit and the cleaning unit are not shown. Hereafter, those for each color are described.

The charging unit almost uniformly charges the front surface of the photoreceptor 15A for each color. The exposing unit is constituted, for example, of an LPH (LED Print Head) having an LED array and an imaging lens, or a laser exposure scanning apparatus in a polygon mirror system, and scans the photoreceptor 15A with laser light based on image data to form an electrostatic latent image. The developing unit develops the electrostatic latent image formed on the photoreceptor 15A with toner. Thereby, a toner image which is a visible image is formed on the photoreceptor 15A. The intermediate transfer belt 15B is stretched on a plurality of rollers and supported so as to be able to travel. By the intermediate transfer belt 15B travelling, the toner image formed on each photoreceptor 15A is primarily transferred at its image transfer position on the intermediate transfer belt 15B. The image transferred on the intermediate transfer belt 15B is transferred on a sheet by the secondary transfer roller 15C. The image transferred on the sheet is fixed by the fixing unit 15D. The colors can include a transparent color. Notably, while in this embodiment, a color image forming apparatus is described, a monochrome image forming apparatus can also be applicable.

In the present embodiment, when a predetermined foil processing region in which a foil image which is a printing target is transferred is selected, for example, by the operation unit 140, a not-shown computer or the like, image data of this foil processing region which is the printing target is formed on each photoreceptor 15A. This toner image can be formed using any of the yellow color, the magenta color, the cyan color and the black color, or can be formed using a color composed of two or more of these colors.

The paper feeding unit 20 has a plurality of paper feeding trays (not shown) containing sheets in sheet sizes such as A3 and A4. The fed sheet is conveyed on a conveying passage 14 through conveying rollers and resist rollers 14A.

On the sheet conveyed at the resist rollers 14A, a resist correction by which oblique travelling of the sheet is corrected is performed by the resist rollers 14A. After the resist correction is ended, the sheet is conveyed to the secondary transfer roller 15C in predetermined timing. At the secondary transfer roller 15C, the toner image which is transferred at the image formation position on the intermediate transfer belt 15B is collectively secondarily transferred onto the front surface of the sheet conveyed from the paper feeding unit 20. The sheet after the secondary transfer is conveyed to the fixing unit 15D.

The fixing unit 15D is provided to the downstream side of the secondary transfer roller 15C in the sheet conveying direction, and has a pressurizing roller, a heating roller and the like. The fixing unit 15D performs pressurizing and heating processing on the sheet on which the image is transferred at the secondary transfer roller 15C, and thereby, fixes the toner image on the front surface of the sheet on the sheet.

On the downstream side of the fixing unit 15D in the conveying direction, a switching unit 14B for switching the conveying path of sheets to the paper discharging path side or to the reversing path side is provided. The switching unit 14B performs switching control of the conveying path based on a selected printing mode (a single side printing mode or a double side printing mode). A sheet on which single side printing is ended in the single side printing mode, or a sheet on which double side printing is ended in the double side printing mode is conveyed to the foil stamping machine 30 by paper discharging rollers 14D after fixing processing is performed thereon at the fixing unit 15D.

Meanwhile, when the sheet is reversed in its face in the double side printing mode, the sheet on the front surface side of which an image is formed is conveyed to a reversing unit 14C through the switching unit 14B. The reversing unit 14C is a mechanism for reversing a sheet and performing printing on the rear surface thereof. To the sheet conveyed to the reversing unit 14C, switch-back conveyance is applied to feed it again to the image forming unit 15 in the state where the rear end of the sheet is put to the top and the sheet is reversed in its face by means of reverse rotation control. As to the sheet fed again to the image forming unit 15, a predetermined toner image is transferred on the rear surface of the sheet at the secondary transfer roller 15C similarly to the image formation processing on the front surface side of the sheet. In the present embodiment, when predetermined toner images are transferred on both sides of a sheet, a predetermined toner image is transferred also on the rear surface side by reversing the sheet in its face. After fixing processing is performed by the fixing unit 15D, the sheet on the rear surface of which the toner image is transferred by the image forming unit 15 is conveyed to the foil stamping machine 30 via the paper discharging rollers 14D and the like.

The control unit 100 controls the whole image forming apparatus main body 10 and controls the image forming system 1. The control unit 100 is including a CPU, a program for causing the same to operate, a storage unit storing operation parameters and the like.

[Exemplary Configuration of Foil Transfer Apparatus]

Next, the foil stamping machine 30 is described. As shown in FIG. 1, the foil stamping machine 30 has a conveying passage 34 so as to be connected from the conveying passage 14 of the image forming apparatus main body 10, and is connected to the post-processing unit 40 on the downstream side in the conveying direction. In the foil stamping machine 30, a foil film sheet feeding unit 32 is provided on the upstream side, in which a foil film sheet is installed in a roll form whose one end can be fed out. Moreover, in the foil stamping machine 30, a foil film sheet winding unit 33 is installed on the downstream side, on which the foil film sheet fed out from the foil film sheet feeding unit 32 and used for transfer is wound.

In the middle of the conveying passage 34, a foil film sheet transfer unit 31 is included, in which the foil film sheet movably extends between the foil film sheet feeding unit 32 and the foil film sheet winding unit 33 via the foil film sheet transfer unit 31.

At the foil film sheet transfer unit 31, the foil film sheet is positioned on the upper face side thereof, and on the lower side thereof, sheets conveyed in the conveying passage 34 move.

In transfer of a foil film, conveyance of the sheet and movement of the foil film sheet are performed under the control where a sheet conveying speed and a speed of the foil film sheet between the foil film sheet feeding unit 32 and the foil film sheet winding unit 33 become the same speed. In the foil film sheet transfer unit 31, the foil film sheet is conveyed therein from the foil film sheet feeding unit 32, a developing agent of the sheet on which an image is formed is overlapped with the foil film sheet to be heated in the foil film sheet transfer unit 31, the melted developing agent fixing the foil sheet thereonto. Upper and lower rollers of the foil film sheet transfer unit 31 are pressed only in foil image transfer, and are released in normal image conveyance.

The foil film sheet having been used for transfer is recovered by the foil film sheet winding unit 33.

In the post-processing unit 40, proper processing such as stapling, punching, folding and booking is performed as needed, followed by paper discharge to the paper discharging unit 41. When the post-processing is not performed, the sheet is discharged to the paper discharging unit 41 as it is.

Figure 2:
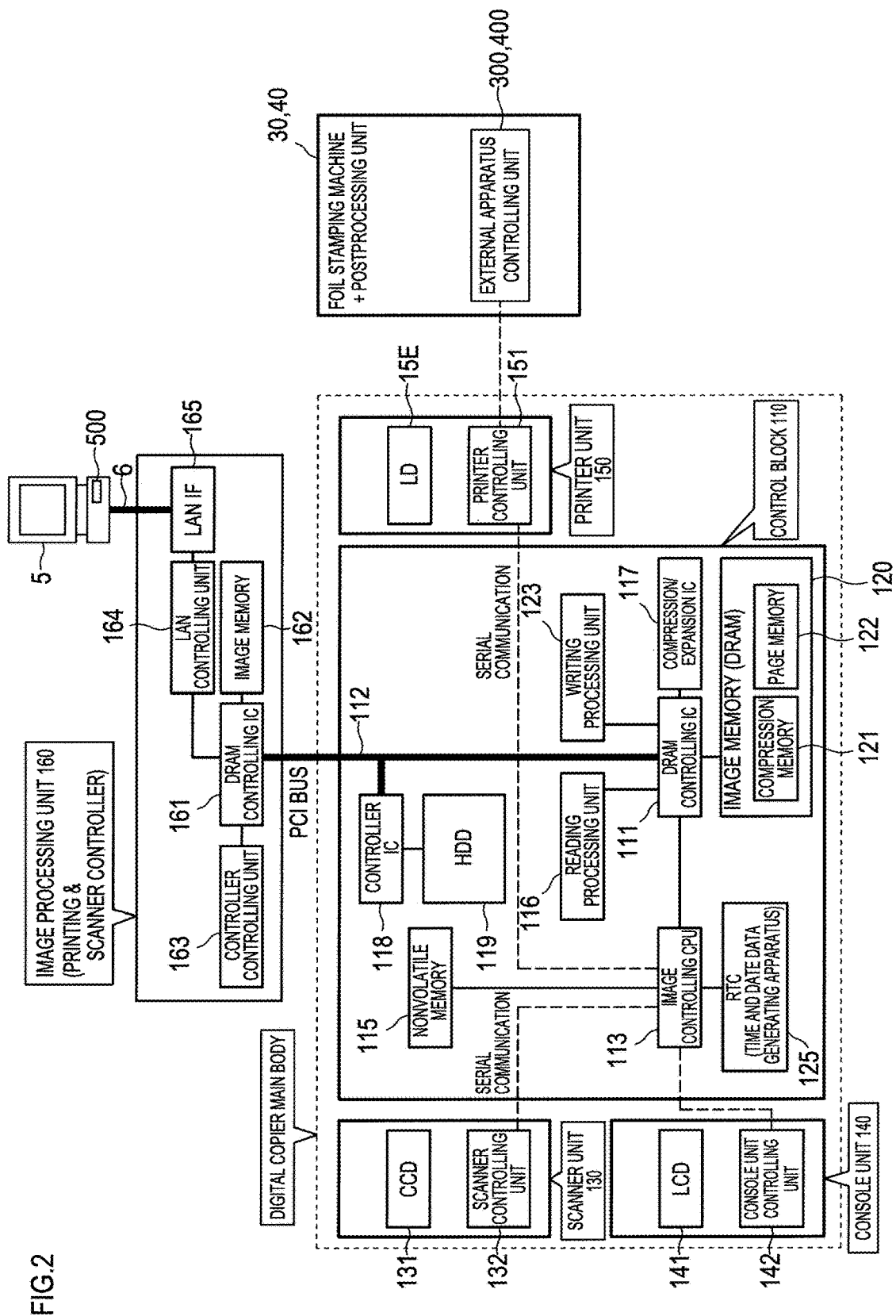
FIG. 2 is a control block diagram according to the embodiment.

Next, a control block in the image forming system is described based on FIG. 2.

The image forming apparatus main body 10 includes, as a primary configuration, a digital copier having a control block 110, a scanner unit 130, the operation unit 140, a printer unit 150, and an image processing unit (printing & scanner controller) 160 that processes image data input and output to/from an external apparatus 5 via a network 6.

The control block 110 has a PCI bus 112 and the PCI bus 112 is connected to a DRAM controlling IC 111 in the control block 110. Moreover, to the PCI bus 112, a HDD 119 is connected via a controller IC 118. The HDD 119 can perform storing of image data and the similar operation.

The control block 110 further includes an image controlling CPU 113, and a DRAM controlling IC 111 is connected to the image controlling CPU 113. Moreover, a nonvolatile memory 115 is connected to the image controlling CPU 113. The nonvolatile memory 115 stores a program executed on the aforementioned image controlling CPU 113, setting data of the image forming apparatus main body 10, process controlling parameters and the like. Therein, the contents and thresholds of image quality adjustment operations with respect to formation operation of a normal image are configured, and furthermore, the presence and absence of image quality adjustment operations with respect to image formation operation for foil stamping, the contents and thresholds of image quality adjustments in the case of performing the image quality adjustments, a patch image used for the image quality adjustments, an accumulation value of the number of printing which is a target of a threshold and the like are configured.

The image controlling CPU 113 controls the whole image forming system 1 by means of executing a program and grasps the state of the whole image forming system 1, performing conveying control of sheets, image formation control and the like. Namely, the image controlling CPU 113, programs operating on the image controlling CPU 113, the nonvolatile memory 115 and the like constitute the control unit 100 of the present invention.

To the image controlling CPU 113, an RTC (time and date data generating apparatus) 125 is connected and can transmit time and date data to the image controlling CPU 113. The time and date data provides time and date data when a threshold is defined based on time and date in an image quality adjustment operation.

The scanner unit 130 includes the CCD 131 which performs optical reading and a scanner control unit 132 which controls the whole scanner unit 130. The scanner control unit 132 is connected to the image controlling CPU 113 so as to be able to perform serial communication therebetween, and accepts control by the image controlling CPU 113. Notably, the scanner control unit 132 can be constituted of a CPU, a program for causing the same to operate, and the like. On image data read by the CCD 131, data processing is performed by the reading processing unit 116. The reading processing unit 116 is connected to the DRAM controlling IC 111.

The operation unit 140 includes a touch panel-type LCD 141 and a operation unit control unit 142, the aforementioned LCD 141 and the operation unit control unit 142 are connected to each other, and the operation unit control unit 142 and the aforementioned image controlling CPU 113 are connected so as to be able to perform serial communication therebetween. With such a configuration, the operation unit 140 is controlled by the image controlling CPU 113. Notably, the operation unit control unit 142 can be constituted of a CPU, a program for causing the same to operate, and the like.

In the operation unit 140, various settings for the image forming apparatus main body 10, the paper feeding unit 20 and the post-processing unit 40 are performed, and based on the settings, image formation, conveyance of sheets and post-processing are controlled by the image controlling CPU 113.

On the operation unit 140, settings in the image forming system 1 and operation control conditions such as operation instructions can be input, display of the contents of the settings, the state of the machine and information can be performed, and these are controlled by the image controlling CPU 113. With this operation unit 140, predetermined operations and the like can be performed.

Moreover, the DRAM controlling IC 111 is connected to an image memory 120 composed of a compression memory 121 and a page memory 122. The image memory 120 stores the image data acquired by the scanner unit 130, and the image data acquired via the network 6. As above, the image memory 120 is a storage region, of image data, which stores image data of a job to be printed. Moreover, the aforementioned DRAM controlling IC 111 can cause the image memory 120 to store image data regarding a plurality of jobs. Namely, the image memory 120 can also store image data of a reserved job. Such image data can also be stored in the HDD 119.

To the DRAM controlling IC 111, a compression/expansion IC 117 which compresses image data or expands compressed data is connected. A writing processing unit 123 is connected to the DRAM controlling IC 111. The writing processing unit 123 is connected to an LD 15E of printer unit 150 and processes data used for operation of the LD 15E. The LD 15E collectively refers to LDs for the colors. Moreover, the printer unit 150 controls the conveying part containing the image forming unit 15 and the conveying passage 14.

The printer unit 150 includes a printer control unit 151 which controls the whole printer unit 150, and the printer control unit 151 is connected to the aforementioned image controlling CPU 113 and accepts its control. Namely, in accordance with parameters given from the image controlling CPU 113, it starts or stops print operation. To the printer control unit 151, an external apparatus control unit 300 for the paper feeding unit 20 and/or the foil stamping machine 30, and an external apparatus control unit 400 for the post-processing unit 40 are controllably connected, and instructions from the image controlling CPU 113 can control conveyance of sheets and post-processing via the printer control unit 151.

Moreover, to the PCI bus 112 which is connected to the DRAM controlling IC 111, the DRAM controlling IC 161 of the image processing unit (printing & scanner controller) 160 is connected. In the image processing unit (printing & scanner controller) 160, an image memory 162 is connected to the DRAM controlling IC 161. Moreover, in the image processing unit (printing & scanner controller) 160, a controller control unit 163 is connected to the DRAM controlling IC 161, and a LAN control unit 164 and a LAN interface 165 are connected to the DRAM controlling IC 161. The LAN interface 165 is connected to the network 6.

To the network 6, the external apparatus 5 is connected and can transmit and receive image data to/from the image forming apparatus main body 10. Moreover, the external apparatus 5 includes an external apparatus control unit 500, which performs control of communication to/from the image forming apparatus main body 10 other than control of the external apparatus 5.

The external apparatus 5 can connect to the network 6 as an apparatus which manages the image forming apparatus, can perform control instruction to the image forming apparatus or direct control. In this case, the external apparatus 5 corresponds to a managing apparatus of the present invention, and the external apparatus control unit 500 corresponds to a management control unit of the present invention.

In this case, the external apparatus control unit 500 can manage the image forming apparatus main body 10. The external apparatus control unit 500 can be constituted of a CPU, a program for causing the same to operate, a storage unit, and the like. With the external apparatus control unit 500, settings or control of image quality adjustment operations can be performed with respect to the image forming apparatus main body 10. Notably, the network 6 can be a WAN, to which the external apparatus 5 is connected.

Next, basic operation of the image forming apparatus is described.

First, a procedure of accumulating image data in the image forming apparatus is described.

When the scanner unit 130 reads an image of a document to generate image data, the CCD 131 optically reads the image of the document from the document in the scanner unit 130. In this stage, the scanner control unit 132 which accepts an instruction from the image controlling CPU 113 performs operation control of the CCD 131. On the image read by the CCD 131, the reading processing unit 116 performs data processing, and image data obtained by the data processing is compressed by the compression/expansion IC 117 in a predetermined manner to be stored in the compression memory 121 and/or the HDD 119 via the DRAM controlling IC 111. The image data stored in the compression memory 121 and/or the HDD 119 can be managed as a job by the image controlling CPU 113.

When image data is externally acquired, the image data transmitted, for example, from the external apparatus 5 or the like via the network 6 is stored in the image memory 162 via the LAN interface 165 and the LAN control unit 164 by the DRAM controlling IC 161 controlled by the controller control unit 163. The data in the image memory 162 is once stored in the page memory 122 via the DRAM controlling IC 161, the PCI bus 112 and the DRAM controlling IC 111. The data stored in the page memory 122 is sequentially sent to the compression/expansion IC 117 via the DRAM controlling IC 111, undergoes compression processing, and is stored in the compression memory 121 and/or the HDD 119 via the DRAM controlling IC 111, being managed by the image controlling CPU 113 similarly to the above.

When the image forming apparatus outputs an image, namely, is used as a copier or a printer, the image data stored in the compression memory 121 or the HDD 119 is sent out to the compression/expansion IC 117 via the DRAM controlling IC 111, the image data is expanded, the expanded image data is repeatedly expanded to the LD 15E by the writing processing unit 123, and thereby, the image data can be printed on a sheet.

When used as a copier, information of printing conditions (printing mode) or the like set on the operation unit 140 is reported, and setting information is created by the image controlling CPU 113. The created setting information can be stored in a RAM in the image controlling CPU 113. Creation of an image for image quality adjustment, and designation of normal printing are also performed here.

When used as a printer, the printing conditions can be set by a printer driver in the external apparatus 5. The printing conditions set here are stored in the page memory 122 via the external apparatus 5, the LAN IF 165, the image memory 162, the DRAM controlling IC 161 (controller) and the DRAM controlling IC 111 (main body) similarly to the image.

Moreover, in the printer unit 150, the printer control unit 151 that has accepted an instruction of the image controlling CPU 113 controls the individual units.

When the image forming apparatus performs image output, the printing conditions are set through the operation unit 140, and with this setting, the image controlling CPU 113 can control printing. In the image forming unit 15, toner images obtained by writing on the photoreceptors 15A by the LD 15E and developing are transferred onto the intermediate transfer belt 15B, and after that, are transferred onto a sheet fed by the paper feeding unit 20 by the secondary transfer roller 15C to be fixed by the fixing unit 15D. The sheet on which the image has been formed is sent to the foil stamping machine 30 as it is through the conveying passage 14, or is sent to the reversing unit 14C and undergoes image formation on the rear surface.

When in a job, an image for foil stamping is formed, and transfer of a foil image and overprinting are performed, in the case where the image for foil transfer is formed on the sheet, the foil image is transferred thereon by the foil stamping machine 30, followed by conveyance to the post-processing unit 40. The sheet on which the foil image has been formed is put in a paper feeding tray of the paper feeding unit 20 or the image forming apparatus main body 10 to be overprinted.

Moreover, in the case where overprinting is performed, pressing of the foil film sheet transfer unit 31 is released in the foil stamping machine, followed by conveyance to the post-processing unit 40, and as needed, post-processing.

Figure 3:
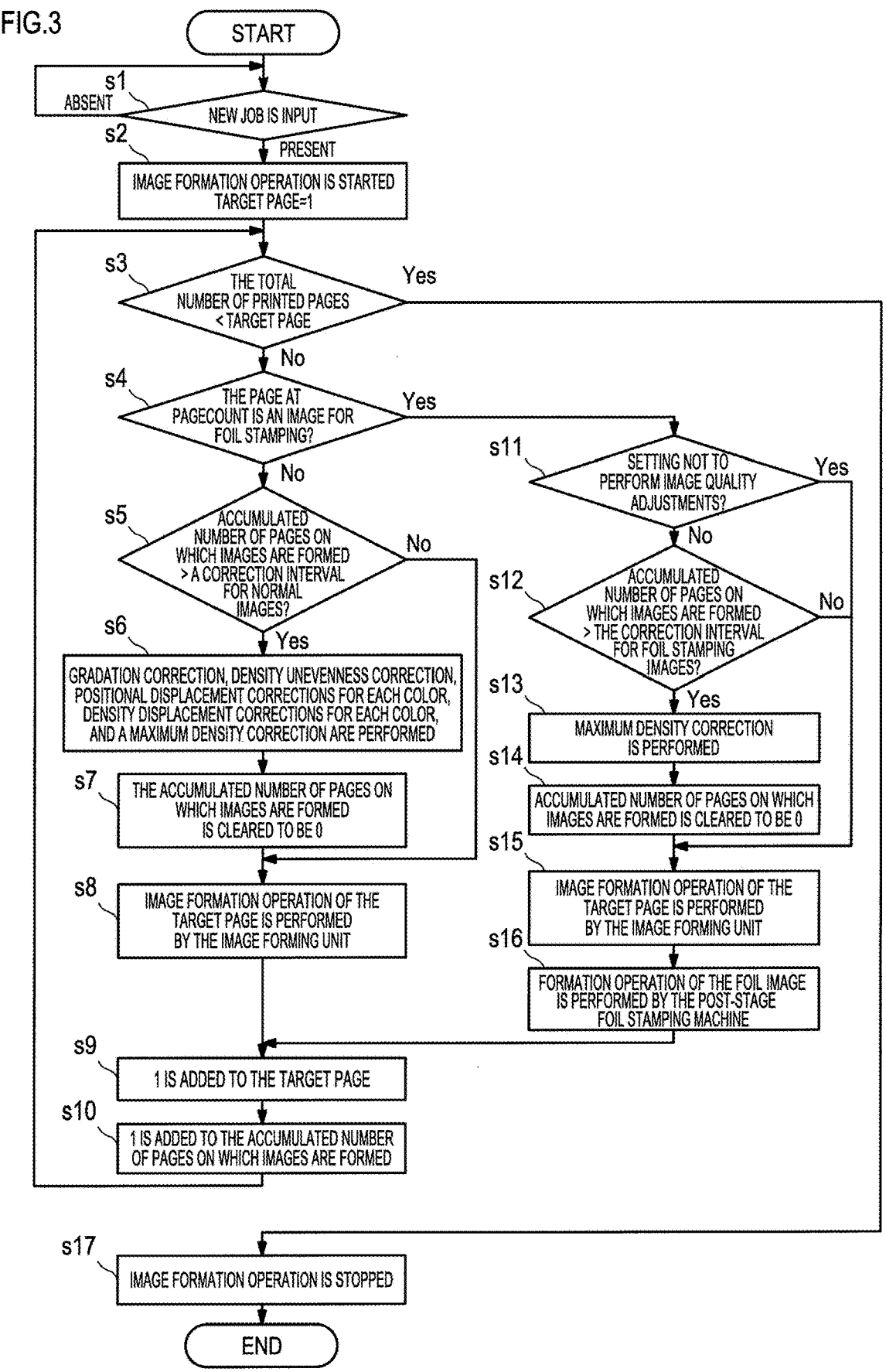
FIG. 3 is a flowchart for explaining a procedure of printing processing based on a job according to the embodiment and FIG. 4 is a diagram showing an operation screen for performing setting of images for foil transfer according to the embodiment.

Next, a printing procedure on a new job is described based on a flowchart in FIG. 3. Notably, the following procedure is performed by an operation of the control unit 100.

After the start of the process, it is determined whether a new JOB is input (step s1). Notably, although not shown in the figure, a plurality of contents of image quality adjustments are registered, and a threshold of performing an image quality adjustment (the number of sheets is herein set as an adjustment interval) is registered for the content of each image quality adjustment. Moreover, the content of an image quality adjustment performed in the case of forming an image for foil stamping and a threshold of the image quality adjustment for foil stamping as to this image quality adjustment are also registered.

Notably, these thresholds can be initially set, or can also be newly set or changed through the operation unit 140 by the user. Moreover, during printing, an accumulated number of pages after an image quality adjustment is counted for each image quality adjustment and stored in the nonvolatile memory 115 or the HDD 119. At the start of the operation, 0 is set to the accumulated number of pages. Moreover, the count number is set to be 0 for the threshold with which an image quality adjustment is performed.

In step s1, when a new JOB is not input (step s1, absent), the process stands by for an input. When a new JOB is input (step s1, present), image formation operation is started. The target page is set to be 1. The target page which is printed for the job is compared with the total number of printed pages, and it is determined whether the target page is larger than the total number of printed pages (step s3). When the target page is larger than the total number of printed pages (step s3, Yes), the image formation operation is stopped (step s17) to end the process.

When the target page is not larger than the total number of printed pages (step s3, No), it is determined whether the page at pagecount is an image for foil stamping (step s4). When the page at pagecount is not an image for foil stamping (step s4, No), it is determined whether an accumulated number of pages on which images are formed is larger than a correction interval for normal images (step s5). The correction interval corresponds to the threshold. When the correction intervals are different depending on the contents of the image quality adjustments, the determination is performed for the content of each image quality adjustment.

When the accumulated number of pages on which images are formed is larger than the correction interval for normal images (step s5, Yes), a gradation correction, a density unevenness correction, positional displacement corrections for each color, density displacement corrections for each color, and a maximum density correction are performed (step s6). When the thresholds are different depending on the image quality adjustments, the image quality adjustments are performed according to the aforementioned determinations.

Notably, while in the present embodiment, switching can be performed on a page-by-page basis, a configuration in which printing for foil stamping is switched on a JOB-by-JOB basis can be employed.

Next, the accumulated number of pages on which images are formed is cleared to be 0 for the image quality adjustment that has been performed (step s7). Notably, when the image quality adjustments are performed at the same period in formation of normal images, the accumulated number of pages on which images are formed can be standardized.

After the accumulated number of pages on which images are formed is cleared, image formation operation of the target page is performed by the image forming unit (step s8).

Moreover, when the accumulated number of pages on which images are formed is not larger than the correction interval for normal images (step s5, No), the process is moved to step s8 to perform image formation operation of the target page by the image forming unit.

After step s8, 1 is added to the target page (step s9). Furthermore, 1 is added to the accumulated number of pages on which images are formed (step s10), the process is moved to step s3, and it is determined whether the target page is larger than the total number of printed pages.

Moreover, when the page at pagecount is an image for foil stamping in step s4 (step s4, Yes), it is determined whether setting has been performed not to perform image quality adjustments in image formation for foil stamping (step s11).

When setting has not been performed not to perform image quality adjustments in image formation for foil stamping (step s11, No), it is determined whether the accumulated number of pages on which images are formed is larger than the correction interval for foil stamping images (step s12). The correction interval corresponds to the threshold of the image quality adjustment. Notably, when the thresholds are different depending on the image quality adjustments, the aforementioned determination is performed for the content of each image quality adjustment. Moreover, when the content of the image quality adjustment to be performed in image formation for foil stamping is specified, the determination is performed for that image quality adjustment.

When the accumulated number of pages on which images are formed regarding the maximum density is larger than the correction interval for foil stamping images (step s12, Yes), a maximum density correction is performed (step s13). In this example, it is supposed that performance of the maximum density correction is set as the image quality adjustment of an image for foil transfer.

Setting can be performed such that the setting performs image quality adjustments other than the maximum density correction along with or not along with the maximum density correction. Moreover, it can also be considered that also as to other adjustment items, the adjustments are configured to be performed at a longer interval than that for normal images.

By performing the image quality adjustment for foil stamping, it can be prevented that the adjustment in normal image printing results in an error due to continuing printing operation without performing the adjustment for a long time.

Next, the accumulated number of pages on which images are formed regarding the maximum density correction is cleared to be 0 (step s14), and image formation operation of the target page is performed by the image forming unit (step s15).

Moreover, when setting has been performed not to perform the image quality adjustment in step s11 (step s11, Yes), the process is moved to step s15, and image formation operation of the target page is performed by the image forming unit.

A condition other than the number of pages (time, an accumulated area of printing, or the like) can also be considered as the threshold of the image quality adjustment.

After step s15, formation operation of the foil image, that is, fixation of the foil film is performed by the post-stage foil stamping machine (foil transfer apparatus) (step s16). Next, 1 is added to the target page (step s9), 1 is added to the accumulated number of pages on which images are formed (step s10), and after that, the process is moved to step s3.

According to the aforementioned procedure, deterioration of efficiency is prevented by not performing image quality adjustments or reducing types of image quality adjustments in formation of images for foil transfer. Moreover, when a correction interval is increased in formation of images for foil transfer, deterioration of efficiency of image quality adjustments can be further prevented.

Figure 4:
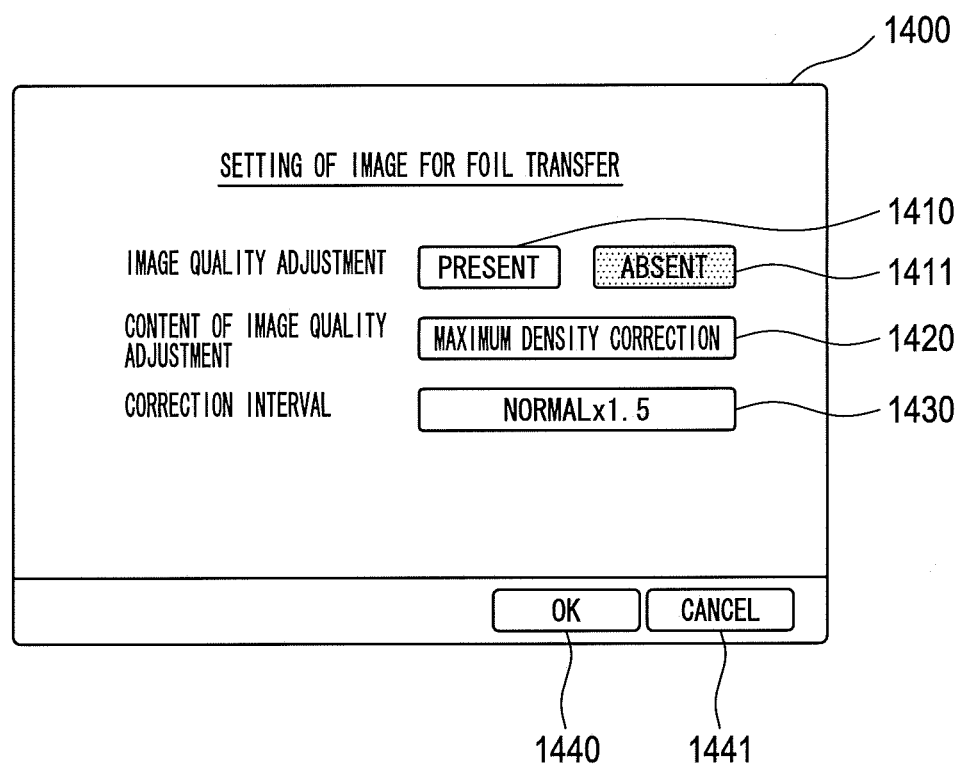

Next, a setting screen of an image quality adjustment with respect to an image for foil transfer is described based on FIG. 4.

FIG. 4 shows a setting screen of images for foil transfer 1400 displayed on the operation unit 140.

As setting items, a "present" button 1410 and a "absent" button 1411 with which the presence or absence of an image quality adjustment for foil stamping is set can be selectively pressed. FIG. 4 shows the state where the "present" button 1410 is pressed and the "absent" button 1411 is not selected. Moreover, an image quality adjustment selection list part 1420 for selecting the image quality adjustment performed with respect to the image for foil transfer is operably displayed therebelow. In the image quality adjustment selection list part 1420, selection of an image quality adjustment from a list display of image quality adjustments selectable in formation of images for foil transfer is enabled. Notably, when only one image quality adjustment is selectable, the image quality adjustment selection list part 1420 is not needed to be provided.

Furthermore, a selection part 1430 for the correction interval regarding the selected image quality adjustment is provided therebelow. The user can select the correction interval displayed on the selection part 1430. Notably, numerical keys or the like can be provided such that the correction interval can be directly set. Moreover, the correction interval can be set to be the same as the correction interval for normal images.

Notably, when the "absent" button 1411 is set in setting the presence or absence of the image quality adjustment, the image quality adjustment selection list part 1420 and the correction interval selection part 1430 can be displayed in a grayout manner such that they cannot be selected.

In the setting screen of images for foil transfer 1400, an "OK" button 1440 and a "cancel" button 1441 can be further displayed such that they can be pressed. When the "OK" button 1440 is pressed, the set items are decided. Moreover, when the "cancel" button 1441 is pressed, the set items are cancelled, for example, so that the contents of setting can be cleared to bring the setting screen of images for foil transfer 1400 into the state before display.

According to the present embodiment, necessity of performing an adjustment (or an adjustment interval) is switched between the occasion of formation of normal images and the occasion of formation of images for foil stamping, and thereby, without affecting formation of normal images, an adjustment time in formation of a foil stamping image can be reduced, and consumable supplies required for the adjustment can be saved.

The present embodiment enables adjustments regarding gradation, density unevenness, and positioning and density displacement of each color not to be performed or to be suppressed in formation of images for foil stamping, which can save and reduce unnecessary adjustments. Thus, without affecting image quality in printing normal images, an output time in formation of images for foil stamping can be reduced, and consumable supplies can be saved.

Here, as to a specific image quality adjustment such as a correction of the maximum density, although high precision as in printing normal images is not needed, a fixation property of the foil film sheet is affected when its displacement amount from the normal value becomes large. Hence, the adjustment is configured to be performed at a longer interval than that for normal images, and thereby, the fixation property of the foil film sheet can be secured.

In the above embodiment, when the printing of the image for the foil transfer is performed, selection is executed both of whether or not the image quality adjustment is performed and the selection for performing the image quality adjustment for the foil transfer is performed.

However, in the present invention, it is possible to select only the image quality adjustment execution or not, or select the image quality adjustment.

Although the present invention has been described and illustrated in detail, it is clearly understood that the same is by way of illustrated and example only and is not to be taken by way limitation, the scope of the present invention being interpreted by terms of the appended claims.

What is claimed is:

1. An image forming apparatus comprising:
an image forming unit that forms an image based on image data; and
a control unit that controls the image forming unit, wherein
the control unit is configured to control an image quality adjustment operation in the image forming unit, to perform a first number of image quality adjustments for non-foil stamping, and to limit the image quality adjustment operation to a second number of specific image quality adjustment(s) for foil stamping, the first number being greater than the second number, and in formation of an image on which the foil stamping is performed, selection of no performance of an image quality adjustment or selection of performance of an image quality adjustment for foil stamping is enabled, wherein the second number of specific image quality adjustment(s) for foil stamping is a subset of the first number of image quality adjustments for non-foil stamping, and wherein the image quality adjustment operation includes: (i) reading image patches formed on a plurality of sheets to obtain reading results, and (ii) determining a state of image formation in accordance with the reading results.

2. The image forming apparatus according to claim 1, wherein the control unit reduces a frequency of the image quality adjustment operation.

3. The image forming apparatus according to claim 1, wherein in formation of the image on which foil stamping is performed, the control unit does not perform an image quality adjustment or employs, as the image quality adjustment operation for foil stamping, one or more of a gradation correction, a density unevenness correction, positional displacement corrections for each color, density displacement correction for each color, and a maximum density correction.

4. The image forming apparatus according to claim 1, wherein the control unit performs an adjustment in formation of an image on which foil stamping is performed as to a maximum density adjustment out of image quality adjustments.

5. The image forming apparatus according to claim 1, wherein when the image quality adjustment operation is performed in image formation for foil stamping, the control unit has, as a threshold for performance of the image quality adjustment operation, a threshold different from that in printing a normal image.

6. The image forming apparatus according to claim 5, wherein the control unit has an independent threshold for each image quality adjustment.

7. The image forming apparatus according to claim 5, wherein the threshold is an adjustment interval.

8. The image forming apparatus according to claim 1, wherein the control unit performs a specific image quality adjustment even in setting of no performance of image quality adjustments in image formation for foil stamping.

9. The image forming apparatus according to claim 1, further comprising a operation unit that accepts operation input, wherein in the control unit, designation of image formation of a normal image or image formation for foil stamping is enabled, and a content of the designation enables selection of setting of a mode in which the image quality adjustment for the normal image is performed or setting of a mode in which the image quality adjustment for foil stamping is performed.

10. An image formation managing apparatus comprising a management control unit that controls an image forming unit that forms an image based on image data, wherein the management control unit is configured to control an image quality adjustment operation in the image forming unit, to perform a first number of image quality adjustments for non-foil stamping, and to limit the image quality adjustment operation to a second number of specific image quality adjustment(s) for foil stamping, the first number being greater than the second number, and in formation of an image on which the foil stamping is performed, selection of no performance of an image quality adjustment or selection of performance of an image quality adjustment for foil stamping is enabled, wherein the second number of specific image quality adjustment(s) for foil stamping is a subset of the first number of image quality adjustments for non-foil stamping, and wherein the image quality adjustment operation includes: (i) reading image patches formed on a plurality of sheets to obtain reading results, and (ii) determining a state of image formation in accordance with the reading results.

11. The image formation managing apparatus according to claim 10, wherein the management control unit reduces a frequency of the image quality adjustment operation for foil stamping.

12. The image formation managing apparatus according to claim 10, wherein in formation of the image on which foil stamping is performed, the management control unit does not perform an image quality adjustment or employs, as the image quality adjustment operation for foil stamping, one or more of a gradation correction, a density unevenness correction, positional displacement corrections for each color, density displacement corrections for each color, and a maximum density correction.

13. The image formation managing apparatus according to claim 10, wherein the management control unit performs an adjustment in formation of an image on which foil stamping is performed as to a maximum density adjustment out of image quality adjustments.

14. The image formation managing apparatus according to claim 10, wherein when the image quality adjustment operation is performed in image formation for foil stamping, the management control unit has, as a threshold for performance of the image quality adjustment operation, a threshold different from that in printing a normal image.

15. The image formation managing apparatus according to claim 14, wherein the management control unit has an independent threshold for each image quality adjustment.

16. The image formation managing apparatus according to claim 14, wherein the threshold is an adjustment interval.

17. The image formation managing apparatus according to claim 10, wherein the management control unit performs a specific image quality adjustment even in setting of no performance of image quality adjustments in image formation for foil stamping.

18. The image formation managing apparatus according to claim 10, further comprising a operation unit that accepts operation input, wherein in the management control unit, designation of image formation of a normal image or image formation for foil stamping is enabled, and a content of the designation enables selection of setting of a mode in which the image quality adjustment for the normal image is performed or setting of a mode in which the image quality adjustment for foil stamping is performed.

19. A non-transitory computer-readable recording medium storing a controlling program executed in a control unit that controls an image forming unit that forms an image based on image data, the controlling program comprising:

a step of performing an image quality adjustment operation in the image forming unit, to perform a first number of image quality adjustments for non-foil stamping, and limiting the image quality adjustment operation to a second number of specific image quality adjustment(s) for foil stamping, the first number being greater than the second number, and a step of performing, in formation of an image on which the foil stamping is performed, selection of no performance of an image quality adjustment or selection of performance of an image quality adjustment for foil stamping, wherein the second number of specific image quality adjustment(s) for foil stamping is a subset of the first number of image quality adjustments for non-foil stamping, and wherein the image quality adjustment operation includes: (i) reading image patches formed on a plurality of sheets to obtain reading results, and (ii) determining a state of image formation in accordance with the reading results.

20. The image forming apparatus according to claim 1, wherein the control unit reduces a frequency of the image quality adjustment operation.

* * * * *